J. F. WILLIAMS.
SANDING DEVICE FOR AUTOMOBILES.
APPLICATION FILED JAN. 20, 1913.

1,081,477.

Patented Dec. 16, 1913.

3 SHEETS—SHEET 1.

Witnesses
Chas. W. Stauffiger.
Anna M Dorr

Inventor
John F. Williams
By

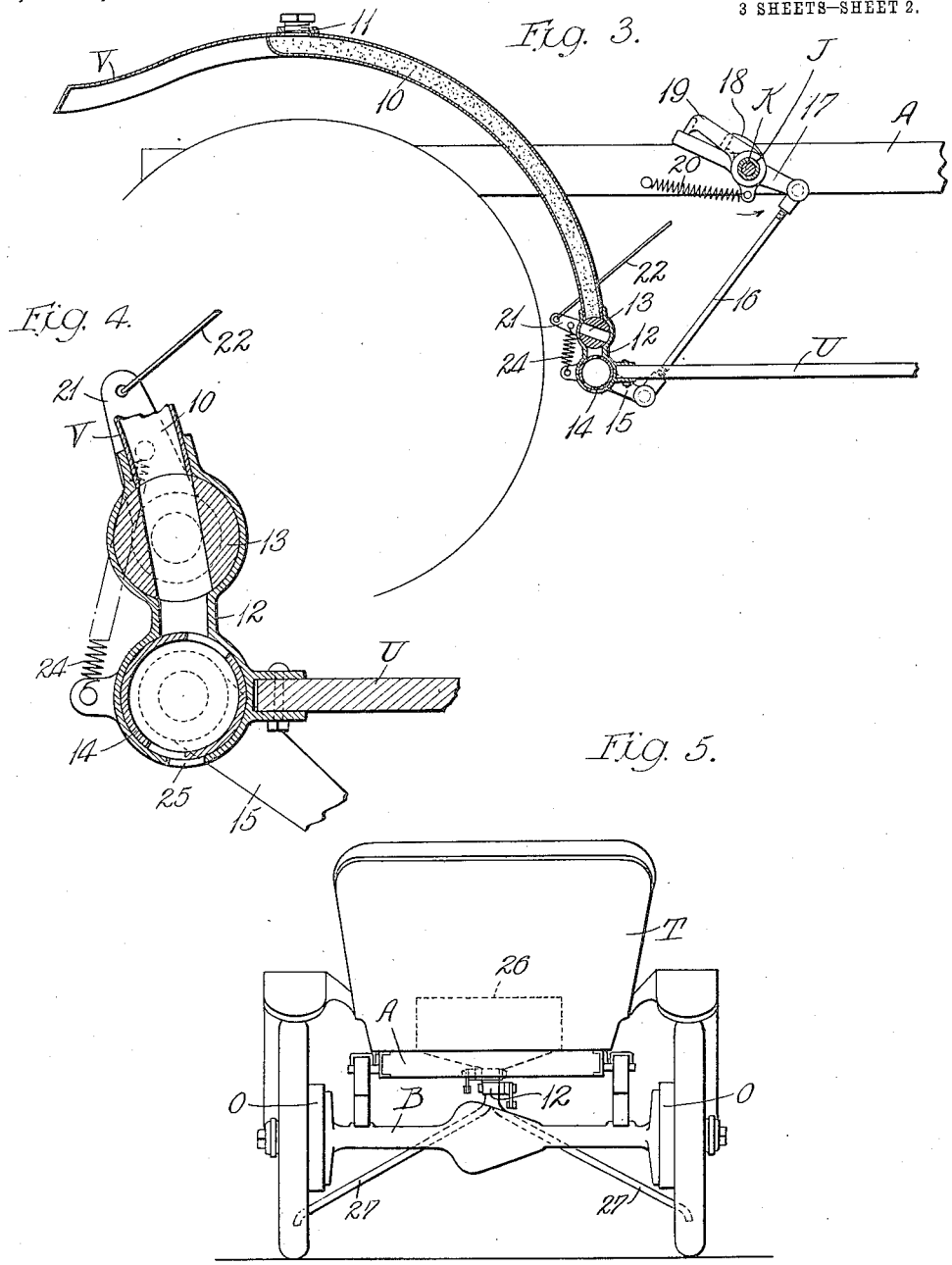

J. F. WILLIAMS.
SANDING DEVICE FOR AUTOMOBILES.
APPLICATION FILED JAN. 20, 1913.
1,081,477.
Patented Dec. 16, 1913.
3 SHEETS—SHEET 3.
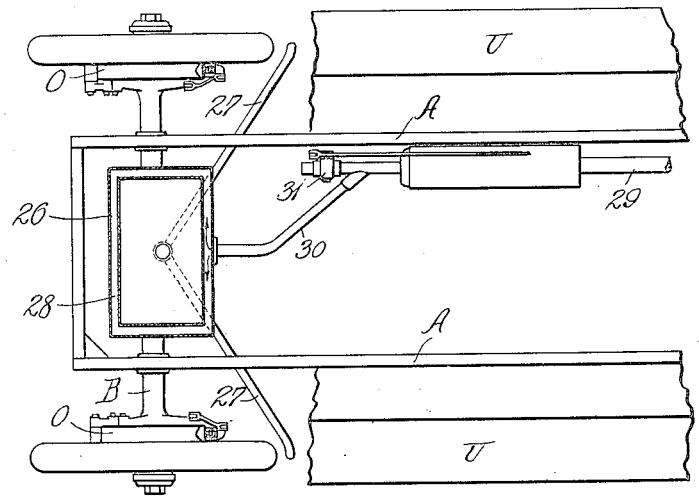
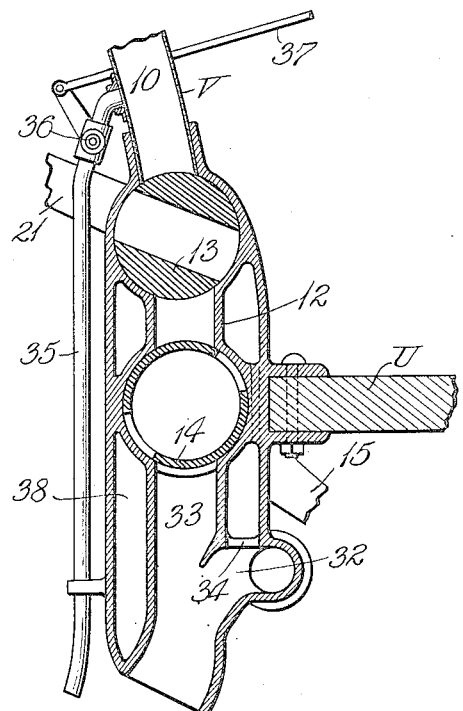
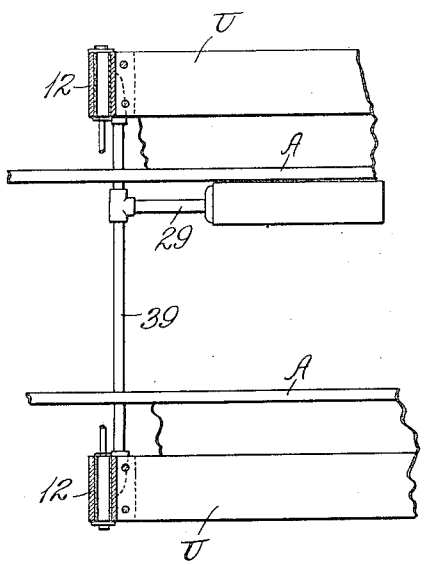
Witnesses:
Chas. W. Stauffiger
Anna M. Dorr
Inventor
John F. Williams,
By
Barthol... atty's.

UNITED STATES PATENT OFFICE.

JOHN F. WILLIAMS, OF DETROIT, MICHIGAN.

SANDING DEVICE FOR AUTOMOBILES.

1,081,477.  Specification of Letters Patent.  Patented Dec. 16, 1913.

Application filed January 20, 1913. Serial No. 743,036.

*To all whom it may concern:*

Be it known that I, JOHN F. WILLIAMS, a citizen of the United States of America, residing at Detroit, in the county of Wayne and State of Michigan, have invented certain new and useful Improvements in Sanding Devices for Automobiles, of which the following is a specification, reference being had therein to the accompanying drawings.

This invention relates to means for delivering sand to the surface of a road bed adjacent to the traction wheels of a motor vehicle to prevent skidding, and its object is to provide a device especially adapted for use upon motor vehicles having means for controlling the discharge of sand which means may be automatically operated by the actuation of the vehicle brake, and having certain other new and useful features in the construction and arrangement of parts, the invention consisting in the matters hereinafter more fully set forth and pointed out in the claims, reference being had to the accompanying drawings, in which—

Figure 1:
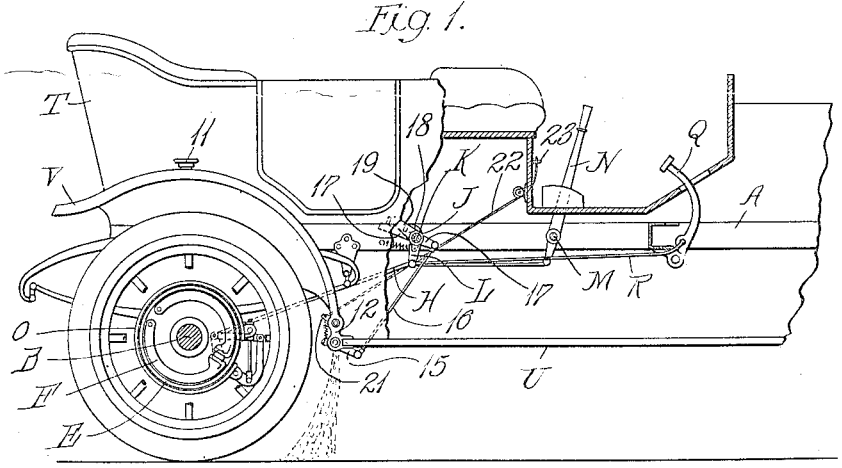
Figure 2:
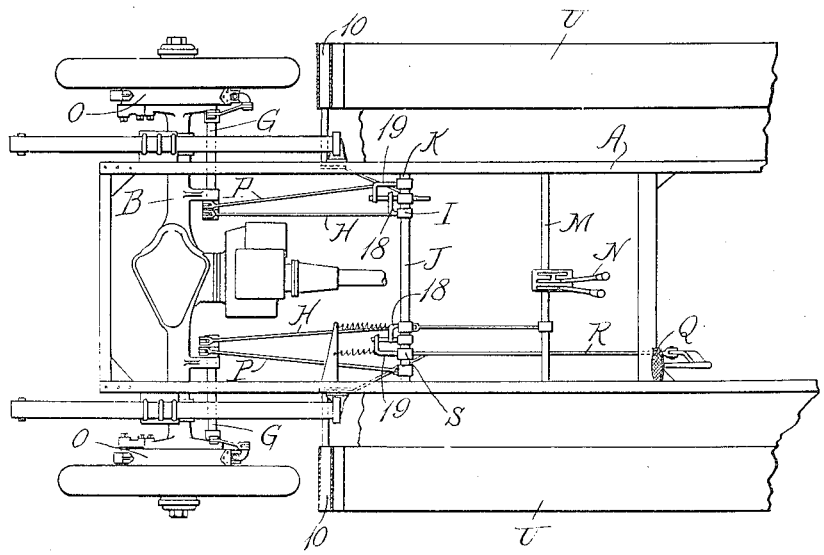
Figure 2:

Figure 1 is a side elevation of a portion of an automobile with parts in section and showing a device embodying the invention applied thereto; Fig. 2 is a plan view of the same with the vehicle body removed; Fig. 3 is an enlarged sectional detail of the device embodying the invention; Fig. 4 is an enlarged sectional view of a valve mechanism; Fig. 5 is a rear elevation of an automobile showing a modified form of the invention applied thereto; Fig. 6 is a plan view of the same with the vehicle body removed; Fig. 7 is a sectional detail showing a further modification; and Fig. 8 is an enlarged sectional view of a modified construction of discharge valve.

For convenience of illustration, the invention is shown as applied to an automobile of the pleasure type but it will be understood that it may be applied as well to any motor vehicle. As shown in the drawings, a suitable frame A is supported upon an axle B which is provided with traction wheels C having brake drums E. Within each drum are the usual brake shoes F which are actuated in the usual manner through the medium of rock shafts G turned by means of rods H extending forwardly to arms L secured to a sleeve J in the usual manner upon a cross shaft K mounted in bearings on the frame. The sleeve J is turned to actuate the brakes, by means of a rod extending forward to an arm on a cross shaft M, which shaft is actuated by an emergency hand lever N. Each brake drum is also provided with an external brake band O, which is operated in the usual manner through the medium of a forwardly extending rod P, which is connected to an arm on the shaft K. Motion is transmitted from a foot pedal Q by means of a rod R attached at its rear end to an arm S on the shaft K.

All of the foregoing parts are constructed and arranged to operate in an old and well known manner and secured upon the frame is a vehicle body T of any desired construction having a running board U and suitable mud guards V. These mud guards are preferably provided with a double wall forming a chamber 10 in each guard adapted to hold a quantity of fine sand which may be placed in each chamber through a fill opening 11. The lower forward end of each mud guard is formed by a suitable valve casing 12 which also forms a connection between the mud guard and running board U. The casing 12 is formed with two valve seats, one for a rotary plug shut-off valve 13, and the other or lower one for a hollow rotary valve 14 which is operated by an arm 15 secured upon the outer end and to which a connecting rod 16 is pivotally attached at one end, the opposite end of said rod being pivotally attached to a rocker bar 17 mounted upon the cross shaft K to turn freely thereon between the arms I and S. Attached to or otherwise arranged to turn with each of the arms I, is a short laterally bent arm 18 projecting over the free end of the rocker bar 17, and secured to turn with each of the arms S is a long laterally extending arm 19 which is bent to project over the free end of the bar 17. Coiled springs 20 are provided to turn the rocker bars and normally hold the same turned with their free ends in engagement with the bent ends of the arms 18 and 19. By reason of the connection between the rocker bars and valves 14, said valves are also turned by the springs and normally held in closed position.

Each valve 13 is turned in one direction by means of an arm 21 on its outer end and a cable 22 attached thereto and running forwardly to the driver's seat where it is engaged over a hook 23 to hold the valve turned to open position against the action of a coiled spring 24. A discharge opening 25 is provided in the bottom of the casing 12 and a like opening is provided in the valve 14 to register therewith.

When the shut-off valve 13 is opened by means of a cable 22, sand will pass through the valve into the hollow discharge valve below, and upon operation of the service brakes by means of the foot pedal Q, the long arms 19 on the rock shaft K will be turned into engagement with the rocker bars 17 and the valves 14 will thus be turned a short distance as shown in Fig. 4, or far enough to open the discharge 25 part way and permit a small amount of sand to escape. When it is necessary to stop the car quickly and the emergency brakes are operated by means of the hand lever N, the short arms 18 will be turned thereby into engagement with the rocker bars 17 and actuate the valves 14. As the arms 18 are shorter than the arms 19, the rocker bars will be turned farther and thus open the valves to their full extent. For ordinary running a small amount of sand is permitted to escape when the service brakes are operated but when an emergency occurs requiring the use of the emergency brakes a larger quantity of sand is automatically released.

In Figs. 5 and 6 a modified construction is shown, the supply of sand being carried in a receptacle 26 located at any convenient point in the body, and provided with a bottom discharge leading to a valve casing similar to the casings 12 and from which casing the sand is conducted by means of discharge pipes 27 to the forward side of each driving wheel adjacent to the road bed. The valve casing contains valves 13 and 14 for controlling the flow from the receptacle 26 which are operated the same as previously described.

In Fig. 6, the sand box 26 is shown as having a double wall and into this space 28 between the walls is conducted hot exhaust gases from the exhaust pipe 29 of the motor, through a connecting pipe 30 opening laterally from the exhaust pipe which is provided at its outer end with a cut out valve 31 which permits gases to escape directly from the pipe to the open air. The hot exhaust gases are thus utilized to heat the sand box and keep the sand warm and dry therein so that it will discharge freely.

When the mud guards are utilized as receptacles for the same, the discharge of the sand may be assisted by forming each valve casing with a hollow wall or jacket as shown in Fig. 8, and conducting hot gases from the exhaust pipe 29 into the chamber 38 thus formed in the valve casing, through a pipe 39, opening into the lower end of each casing through an inlet passage 32 which opens directly into the side of a discharge passage 33 for the sand leading from the lower side of the valve 14. An opening 34 from the passage 32 into the jacket 38 permits some of the hot gases to escape into the jacket around the valves and heat the same so that they will turn freely and the sand contained therein will be thoroughly dried.

When traveling over wet and slippery pavements it may be found desirable to discharge a small amount of sand while the car is moving forward and the brakes are inoperative, to prevent the car from skidding or sliding sidewise. To permit such continuous escape with but the necessity of operating the brakes, a bypass is formed around each valve casing by providing a small tube 35 as shown in Fig. 8, adjacent to the rear side of the casing and opening at its upper end into the supply chamber above the shut-off valve. This tube is provided with a valve 36 which may be operated by a rod 37 or in any other suitable manner to control the flow through the tube.

Obviously changes may be made in the construction and arrangement of parts without departing from the spirit of my invention, and I do not limit myself to the particular form or arrangement shown.

Having thus fully described my invention what I claim is:—

1. The combination with a motor vehicle having service brake operating mechanism and emergency brake operating mechanism, of a receptacle on the vehicle having an outlet positioned to discharge material in the path of the vehicle wheel, and means for controlling said outlet operated by each of said mechanisms independently of the other.

2. The combination with a motor vehicle having a plurality of controlling mechanisms, of a receptacle on the vehicle having an outlet adjacent to the forward side of the vehicle wheel for the discharge of material into the path of said wheel, and means controlling said outlet operated by the actuation of one of said mechanisms to discharge a limited amount of material and operated independently by the actuation of the other of said mechanisms to discharge a greater volume.

3. The combination with a motor vehicle having traction wheels and brake mechanism for said wheels, of a receptacle having an outlet in the path of the wheels, a valve actuated by the operation of the brake mechanism to control the discharge of material from said receptacle, and a shut-off for said outlet.

4. The combination with a motor vehicle having a motor exhaust pipe, of a receptacle on the vehicle for material to be discharged in the path of the vehicle wheels, means for conducting hot gases from the exhaust pipe to said receptacle to heat the same, and means for controlling the discharge of material from said receptacle.

5. The combination with a motor vehicle, having controlling means, of a receptacle on the vehicle having an outlet passage, a controlling valve in said passage, means for automatically operating said valve by the actuation of the controlling means, an auxiliary passage, and a manually operated valve controlling said auxiliary passage.

6. The combination with a motor vehicle having controlling means, of a receptacle on the vehicle having a discharge passage, a manually operable shut-off valve in said passage, an automatically operated valve in said passage below the shut-off valve, means actuated by the controlling means of the vehicle for turning said automatic valve, an auxiliary passage opening into the main passage above the shut-off valve, and a manually operated valve in said auxiliary passage.

In testimony whereof I affix my signature in presence of two witnesses.

JOHN F. WILLIAMS.

Witnesses:
LEWIS E. FLANDERS,
ANNA M. DORR.